Patented Nov. 20, 1934

1,981,515

UNITED STATES PATENT OFFICE

1,981,515

INTERMEDIATES FOR RHODAMINE DYESTUFFS

Lucas P. Kyrides, Buffalo, N. Y., assignor to National Aniline & Chemical Company, Inc., New York, N. Y., a corporation of New York No Drawing. Application December 1, 1928, Serial No. 323,187

13 Claims. (Cl. 260—128)

This invention relates to the production of new rhodamine dyestuffs. It relates particularly to the production of new rhodamine dyestuffs which are derivatives of mono-secondary-alkyl aromatic amines having the probable formula:

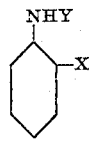

in which X represents hydrogen or an alkyl group, and Y represents a secondary alkyl group. The invention also includes processes of producing said dyestuffs as well as new intermediate products for said dyestuffs.

It has been found, in accordance with the present invention, that the rhodamine dyestuffs which are obtainable from mono-secondary-alkyl arylamines give dyeings which are of a bluer and brighter shade than those obtained with the dialkyl rhodamine dyestuff heretofore prepared and described in the literature as Rhodamine 6G (C. I. No. 752).

It has furthermore been found, in accordance with the present invention, that in the production of rhodamine dyes from said mono-secondary-alkyl arylamines, new intermediate products are produced, said products being represented by the following general formula:

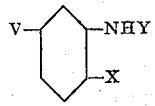

wherein X represents hydrogen or an alkyl group, Y represents a secondary-alkyl group, and V represents an —OH group, an —SO$_3$H group, or an alkali-metal salt of a sulfonic acid group.

It has furthermore been found, in accordance with the present invention, that in the production of rhodamine dyestuffs from mono- or dialkylamino phenols by a process comprising sulfonation of the corresponding N-alkyl arylamines and alkali fusion of the resulting sulfonated mixture, the product obtained can be used for the production of rhodamine dyestuffs without being subjected to a purification treatment, such as, crystallization or distillation.

It has furthermore been found, in accordance with the present invention, that in the production of rhodamine dyestuffs by a process which comprises sulfonating a mono-secondary-alkyl aromatic amine, fusing the sulfonic acids thus produced, or their salts, with caustic alkali, condensing the resulting phenol with phthalic anhydride, isolating the rhodamine base, and esterifying said rhodamine base with an alcohol in the presence of a mineral acid catalyst, the mixture of isomeric sulfonic acids formed upon sulfonation of said amine need not be separated but the mixture of sulfonic acids or their salts can be fused, that the resulting amino phenol recovered from the fusion is chiefly a meta-mono-secondary-alkylamino phenol, that the said phenol need not be pure and that the rhodamine base need not be pure in order to be useful in the preparation of the rhodamine dyestuff.

It has furthermore been found in accordance with the present invention, that in the preparation of a rhodamine base from a 4-hydroxy-2-mono-alkylamino toluene by condensation with phthalic anhydride, the reaction can be carried out in the absence of a condensing agent (such as, zinc chloride or sulfuric acid) while causing little or no decrease in the yield of rhodamine base.

In preparing the new dyestuffs of the present invention in accordance with one method of procedure, a mono-secondary-alkyl aromatic amine (such as, isopropyl aniline, isopropyl o-toluidine, secondary-butyl aniline or o-toluidine, isopropylamino o-ethylbenzene, secondary-butylamino o-ethylbenzene, etc., which may be prepared, for example, by heating the corresponding aromatic primary amine with the corresponding secondary-alkyl halide) is sulfonated with oleum, and the resulting mixture of sulfonic acid derivatives, or their alkali-metal salts, is subjected to a caustic fusion treatment, whereby a meta-mono-secondary-alkylamino phenol is produced. The resulting meta-mono-secondary-alkylamino phenol is then condensed with phthalic anhydride, the condensation product is hydrolyzed to form the corresponding di-secondary-alkyl rhodamine base, and the rhodamine base is converted to the new rhodamine dyestuff by an esterification treatment.

The new isopropylated rhodamine dyestuffs, in their esterified form, are represented by the following probable formula:

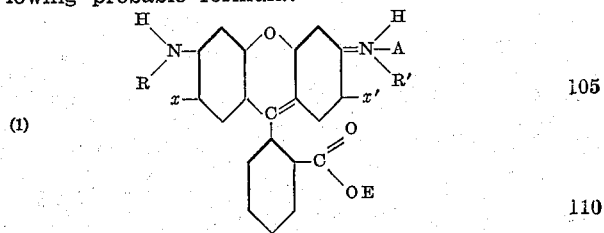

wherein $x$ and $x'$ are like or unlike substituents and represent hydrogen or an alkyl group, R and R' represent like or unlike alkyl groups of which at least one is the isopropyl group

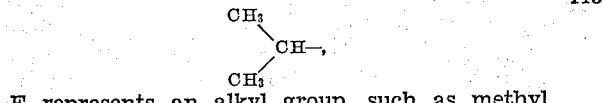

E represents an alkyl group, such as methyl, ethyl, propyl, butyl, amyl, etc., and A represents an acidic anion, for example—Cl, ½—SO₄, etc. The new alkylated rhodamine dyes give dyeings which are of a bluer and brighter shade than those obtained with the rhodamine dyestuff as heretofore prepared (C. I. No. 752).

The new isopropylated rhodamine dyes may conveniently be prepared by esterifying with a suitable alcohol in the presence of an esterification catalyst, the isopropylated rhodamine bases having the following probable formula:

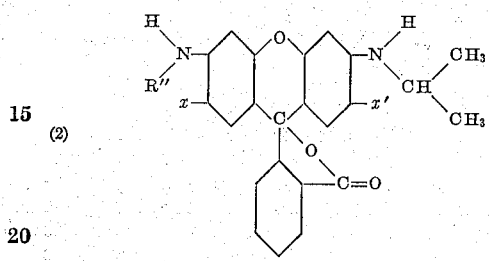

(2)

wherein $x$ and $x'$ are like or unlike substituents and represent hydrogen or an alkyl group, and R″ represents an alkyl group. The esterification may be accomplished with methanol, ethyl alcohol, amyl alcohol, or any other suitable alcohol. As esterification catalysts may be mentioned hydrochloric acid, sulfuric acid, etc.

The new isopropylated rhodamine bases may conveniently be prepared by condensing with phthalic anhydride, an isopropylamino phenol having the following probable formula:

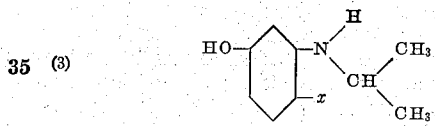

(3)

wherein $x$ represents hydrogen or an alkyl group, which may be one ingredient of a mixture which also contains a different alkylaminophenol.

The said isopropylaminophenol may conveniently be prepared by fusing with caustic alkali the isopropylamino arylsulfonic acid which may be prepared by condensing an isopropyl halide with a meta-aminoarylsulfonic acid of the benzene series. The isopropylaminoaryl sulfonic acid may also be prepared by sulfonating the isopropylarylamine which may be prepared by condensing an isopropyl halide with an arylamine of the benzene series. The said isopropylaminoarylsulfonic acids have the following probable formula:

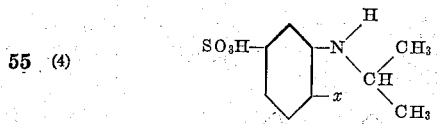

(4)

wherein $x$ represents hydrogen or an alkyl group.

In preparing the mono-secondary-alkylamino benzene sulfonic acids and their ortho-alkyl derivatives (the alkyl group ortho to the amino group) in accordance with one method of procedure, a mono-secondary-alkyl aromatic amine, or a mixture thereof with the corresponding primary aromatic amine (such as can be obtained by heating a mixture of a primary aromatic amine with a secondary-alkyl halide and distilling after treating with an alkali), or a mixture of several mono-secondary-alkyl aromatic amines, is reacted with oleum containing an amount of SO₃ in excess of that theoretically required to convert the secondary-alkyl aromatic amine into its mono-sulfonic derivatives. The reaction mass is drowned in cold water, and the resulting sulfonic acids are isolated as the free acids or as their alkali-metal salts, according to well-known methods of separating sulfonic acids from solutions. There results a mixture of isomeric, or of homologous and isomeric, mono-secondary-alkylamino aromatic sulfonic acids or their alkali-metal salts, said mixture including a meta-mono-secondary-alkylamino aromatic sulfonic acid or salt (such as, meta-mono-isopropylamino benzene sulfonic acid or its alkali-metal salt, 3 - mono - isopropylamino - 4 - methyl - benzene sulfonic acid or its alkali-metal salt, meta-mono-secondary-butylamino-benzene sulfonic acid or its alkali-metal salt, etc.).

The resulting mixture of sulfonic acids or salts may be then separated into the individual mono-secondary-alkylamino aromatic sulfonic acids or salts (for example, by fractional crystallization), and the meta-mono-secondary-alkylamino aromatic sulfonic acid or salt may be used in the subsequent steps of the process.

If desired, the meta-mono-secondary-alkylamino aryl sulfonic acids or salts can be alternatively prepared by heating, preferably in an autoclave, the corresponding primary aromatic amino sulfonic acids (such as, metanilic acid, o-amino-p-sulfotoluene) or their alkali-metal salts with an alkali-metal carbonate and a secondary alkyl halide; that is, an alkyl halide containing the grouping

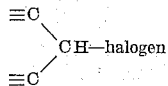

(such as, isopropyl-, secondary-butyl-, a secondary-amyl-, or a secondary-hexyl-chloride, bromide, or iodide, or a higher secondary alkyl halide). The resulting alkali-metal salts of meta-mono-secondary-alkylamino aryl sulfonic acids are then separated from the reaction mass, as for example, by extraction with an organic solvent, filtering, and distilling off the solvent or by any well-known method for separating organic salts from inorganic salts, or the reaction mass may be evaporated to dryness without separation of the inorganic salts, and the evaporated mass may be used as such.

It has been found, as above pointed out, that the mixture of isomeric sulfonic acids or salts need not be separated, but that the mixture of mono-secondary-alkylamino aromatic sulfonic acids or alkali-metal salts resulting from the sulfonation operation, or the mixture of meta-mono-secondary-alkylamino aromatic sulfonic acid alkali-metal salts mixed with inorganic salts which results from the above alternative process, can be directly fused with caustic alkali for the production of meta-mono-secondary-alkylamino phenols, which also form a part of the present invention and are useful intermediates for the production of rhodamine dyestuffs.

In preparing the mono-secondary-alkylamino phenols in accordance with a preferred method of procedure, one of the mixtures obtained as above indicated, and containing a meta-mono-secondary-alkylamino aryl sulfonic acid or alkali-metal salt, is fused with potassium hydroxide, or with a mixture of potassium and sodium hydroxides, preferably while excluding air by maintaining a blanket of an inert gas (such as, superheated steam, ammonia, nitrogen, etc.) over the surface of the melt. A meta-mono-secondary-alkylamino phenol is formed (such as, meta-isopropyl-amino phenol, mono-secondary-butyl-amino phenol, 3-mono-isopropylamino-4-methyl phenol, etc.) and this is recovered from the melt, after dilution with water, by addition to the diluted fusion mass of a mineral acid (such as sulfuric acid) in just sufficient amount to render the diluted melt slightly alkaline to phenolphthalein, and washing of the separated secondary-alkylamino phenol with water; or the meta-mono-secondary-alkylamino phenol may be recovered from the melt in any other manner well-known to the art for the recovery of amino phenols from caustic alkali melts. The meta-mono-secondary-alkylamino phenol thus obtained may be purified by fractional distillation; but it has been found, as above indicated, that the secondary-akylamino phenol need not be fractionally distilled or purified by crystallization from an organic solvent before being employed in the subsequent steps of the process, but can be directly condensed with phthalic anhydride for the production of the corresponding di-secondary-alkyl rhodamine base, which rhodamine bases form a part of the present invention, and can be converted into the new rhodamine dyestuffs of the present invention by an esterification treatment.

In preparing the new rhodamine bases in accordance with one method of procedure, a meta-mono-secondary-alkylamino phenol (such as is obtainable as above described), or a mixture of the same with a different N-alkylaminophenol, is heated with an excess of phthalic anhydride, preferably while excluding air. The resulting mass is then treated with a dilute alkaline solution, preferably with the aid of heat, and the rhodamine base is separated and washed. The rhodamine base can be dried if desired, but such treatment is not necessary to the production of the corresponding rhodamine dyestuff from said base by an esterification treatment, although drying is preferred.

In carrying out the production of the new rhodamine dyes, according to one method of procedure, the rhodamine base is reacted with an alcohol (such as, methyl alcohol, ethyl alcohol, or a higher alcohol) in the presence of an esterification catalyst (such as HCl, $H_2SO_4$, etc.) and the resulting rhodamine dyestuff is separated from the resulting solution and purified; for example, by dissolving it in hot water and precipitating the purified dyestuff by means of HCl, NaCl, etc., preferably after filtering the solution. If, in the preparation of the rhodamine dyestuff from the corresponding rhodamine base, a purified base is employed and the esterification is carried out with HCl and an alcohol, the resulting dyestuff can be directly obtained by evaporating the esterification reaction mixture to dryness.

The rhodamine dyestuffs thus obtained are when pulverized red to red-brown powders, soluble in water with a greenish fluorescence, and dyeing textile fibers bluish and bright shades of red having a high degree of fastness.

For a better understanding of the invention, reference should be had to the following specific examples wherein are described and illustrated representative products and preferred methods for producing them in accordance with the invention; but it is to be understood that the invention is not limited thereto. The parts are by weight.

*Preparation of alkylamine sulfonic acid*

*Example 1.*—200 parts of mono-isopropyl ortho-toluidine (obtained, for example, by treatment of ortho-toluidine with an isopropyl halide, and boiling at about 215°–220° C.) is introduced into about 500 parts of 26 per cent oleum while taking care that the temperature does not rise above 75° C., preferably not above 30° C. The temperature is then brought to about 75° C. and about 100 parts of 60 per cent oleum are added to insure complete sulfonation. The mass is then drowned in an ice and water mixture and the resulting solution allowed to crystallize. The crystals are filtered and washed with cold water until acid free. The product comprises a mixture of sulfonic acid derivatives of isopropyl ortho-toluidine, being mainly a mixture of 3-isopropylamino-4-methyl-benzene sulfonic acid and 4-isopropylamino-3-methyl-benzene sulfonic acid. This mixture can be used directly for the preparation of rhodamines by fusion with alkali and condensation of the resulting cresol with phthalic anhydride followed by hydrolysis and esterification.

If desired, however, the mixture can be dried by heating in vacuum or atmospheric dryers, preferably at temperatures above 100° C. Furthermore, if desired, the mixed product may be resolved into its constituent parts by fractional crystallization and the 3-isopropylamino benzene sulfonic acid derivative may be alone employed in preparing a rhodamine dyestuff; but such treatment is not necessary when the product is employed in the preparation of a rhodamine dyestuff in accordance with the present invention, inasmuch as it has been found that the 3-isopropylamino-benzene sulfonic acid derivatives are alone converted to the corresponding phenolic compounds by fusion with caustic, the 4-isopropylamino-benzene sulfonic acid derivatives being eliminated in the fusion.

By substituting corresponding molecular proportions of isopropyl aniline, mono-secondary-butyl aniline, mono-secondary-butyl o-toluidine, or a higher secondary-alkylamino derivative of aniline or o-toluidine for the mono-isopropyl o-toluidine of the above example, and by proceeding in an analogous manner, the corresponding mono-alkylamino aryl sulfonic acids may be prepared. These compounds are generically represented by the formula:

$$MO_3S-\underset{4}{\underset{|}{\overset{2}{\underset{1}{\bigcirc}}\overset{3}{}}}-NHY\Big]_x$$

wherein $x$ represents hydrogen or an alkyl group $y$ represents a secondary-alkyl group, such as $$\begin{array}{cccc}
CH_3\!\!\diagdown & CH_3\!\!\diagdown & C_2H_5\!\!\diagdown & \\
\quad CH-, & \quad CH-, & \quad CH-, & \\
CH_3\!\!\diagup & C_2H_5\!\!\diagup & C_2H_5\!\!\diagup & \\
& & & \\
C_3H_7\!\!\diagdown & C_3H_7\!\!\diagdown & C_4H_9\!\!\diagdown & \\
\quad CH-, & \quad CH-, & \quad CH-, & \text{etc.,} \\
CH_3\!\!\diagup & C_2H_5\!\!\diagup & CH_3\!\!\diagup & 
\end{array}$$

and M represents hydrogen or an alkali-metal. It will be understood that the bracket indicates that the groups $x$ and NHY may alternatively occupy the 3- or 4- positions, respectively, in the benzene ring.

The meta-mono-secondary-alkylamino benzene sulfonic acid derivatives may also be prepared from the corresponding aromatic primary amino meta-sulphonic acids or their alkali-metal salts by treatment thereof with a secondary alkyl halide, as will be evident from a consideration of the following specific example.

*Example 2.*—120 parts of isopropyl chloride are added to a mixture of 120 parts of sodium carbonate, 147 parts sodium metanilate (or equivalent proportions of metanilic acid and alkali) and 300 parts of isopropyl alcohol contained in an autoclave. The autoclave is closed and under agitation the temperature is raised to about 130°–150° C. and maintained at about that point for about 24 hours. The heating is then discontinued and the autoclave allowed to cool, preferably while still maintaining agitation. When cold, the contents of the autoclave are removed and evaporated to dryness. The residue, which consists principally of the sodium salt of mono-isopropyl metanilic acid having the probable formula:

can be fused without further purification for the preparation of the corresponding phenol. If desired, however, the contents of the autoclave can be extracted with alcohol, and the alcohol evaporated off from the resulting solution.

It will be evident that instead of the sodium salt, other alkali-metal salts may be prepared by alkylation of the corresponding alkali metal salt of metanilic acid in the presence of the corresponding alkali-metal carbonate.

If in the above example there is substituted for the sodium metanilate (or metanilic acid) corresponding molecular proportions of its ortho-methyl or ortho-ethyl homologs, e. g., ortho-amino para-sulfo toluene (3-amino-4-methyl-benzene sulfonic acid), corresponding homologous phenols, such as, ortho-isopropylamino para-sulfotoluene having the formula

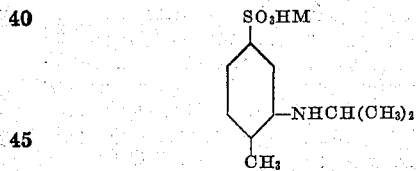

may be obtained; and if instead of the isopropyl chloride, isopropyl bromide, or higher secondary-alkyl halides are employed, the same or corresponding mono-secondary-alkylamino aryl sulfonic acids and their alkali-metal salts may be obtained, having the probable formula

wherein X is hydrogen or an alkyl group, Y is a secondary-alkyl group, and M is hydrogen or an alkali-metal.

*Preparation of alkyl aminophenol*

Example 3.—A mixture comprising about 130 parts of potassium hydroxide and 30 parts of sodium hydroxide, or its equivalent of potassium hydroxide, is charged into a closed fusion kettle and heated until fused. To the agitated melt maintained at a temperature of about 240° C., 173 parts of the mixture of isopropyl orthotoluidine sulfonic acids obtained according to Example 1 is gradually added over a period of about 1½ hours while excluding air as far as possible, preferably by means of a blanket of superheated steam. The fusion mass is then heated for an additional period of about 4 hours, or until reaction is substantially complete, at a temperature of about 250° C., preferably while maintaining the blanket of superheated steam over the surface of the melt. While continuing the passage of superheated steam, the mass is then permitted to cool to a temperature above its solidification point. The admission of superheated steam into the vessel is interrupted, and water is cautiously added to the mass. The resulting solution is then filtered to remove iron oxides and other impurities, and the filtrate is treated, preferably at a temperature above about 60° C., with sulfuric acid until just slightly alkaline to phenolphthalein. On cooling to about 45° C. and seeding with a crystal of isopropylamino cresol from a previous preparation, a mass of fine granules of o-isopropylamino-p-cresol is obtained which, after cooling to 30° C., are filtered off and washed with cold water. The granules are then melted with about 200 parts of hot water with agitation, about 1 part of sodium carbonate is added to insure alkalinity to phenolphthalein, and the solution is cooled to granulate the isopropylamino cresol. After filtering and washing, the granular isopropylamino cresol can be purified further if desired by fractionating in vacuo, or by crystallizing from benzene or other suitable solvent. The distilled isopropylamino cresol possesses a setting point of about 94° C. By further purifying, as for example, by crystallizing from benzene or toluene, crystals can be obtained having a setting point of about 94.5° C. The product has the probable formula:

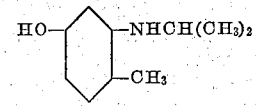

During the fusion process the ortho-isopropylamino para-sulfotoluene is converted into ortho-isopropylamino para-cresol, whereas the other isomeric sulfonic acids are not converted to their corresponding phenols; so that starting with a mixture of isomeric sulfonic acids of ortho-isopropylamino toluene, a product is obtained consisting substantially of o-isopropylamino para-cresol. If, in the above example, sulfonated mono-isopropyl aniline is employed, meta-isopropylamino phenol having a setting point of about 99.5° to 100° C. can be obtained.

In an analogous manner o-mono-secondary-butylamino cresol and higher secondary-alkyl-amino phenols, cresols and homologs may be obtained from the corresponding mono-secondary-alkylamino aryl sulfonic acids or their alkali-metal salts. These compounds are generically represented by the formula:

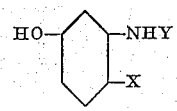

wherein X represents hydrogen or an alkyl group, and Y represents a secondary-alkyl group, such as,

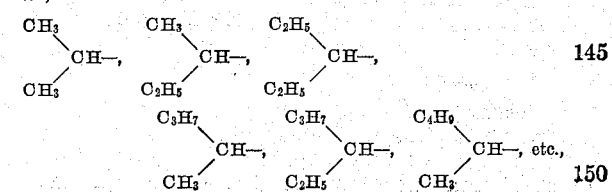

Instead of subjecting the mixture of isomeric sulfonic acids obtained on sulfonating the secondary-alkyl amine to the above fusion, the meta-alkylamino aryl sulfonic acids obtained in accordance with Example 2 may be employed in accordance with the above example, thereby obtaining the corresponding alkylamino phenols.

*Preparation of rhodamine base*

Example 4.—A mixture of about 15 to 18 parts of phthalic anhydride and 15 parts of the isopropylamino cresol obtained in accordance with Example 3 is heated at about 180°–190° C. with slow agitation, preferably while excluding air. Agitation is then discontinued, the mass solidifies, and heating is continued until the condensation is complete (an additional period of about 3 hours), the temperature of the bath being about 180–190° C. The mass is then allowed to cool, is broken into lumps or ground to a powder, and the rhodamine base is isolated by treatment of the condensation product with dilute caustic alkali, preferably with the aid of heat. The resulting rhodamine base is filtered, washed and preferably dried. The product obtained is di-isopropyl rhodamine base, having the probable formula:

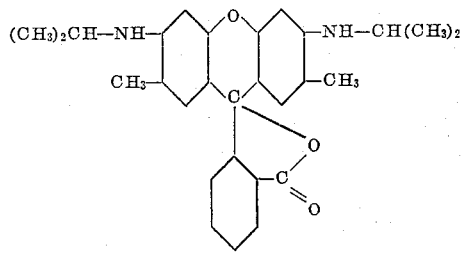

and being a bright red to red-brown solid.

If for a part of the isopropylaminocresol in the above Example 4, the stoichiometrical proportion of a different meta alkylaminophenol having a normal or secondary alkyl group, for example

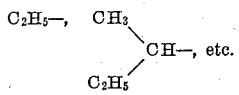

attached to the amino group be substituted, a mixture of various rhodamine bases having the following probable formula may be obtained:

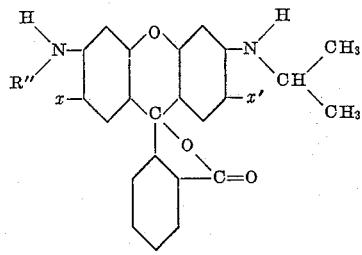

wherein $x$ and $x'$ are like or unlike substituents and represent hydrogen or an alkyl group, and $R''$ represents an alkyl group which may be a primary or secondary alkyl group, such as

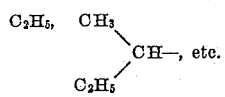

The preparation of secondary-isobutyl compounds and rhodamine dyes obtained therefrom and of the higher homologues, are described and claimed in my copending application for Secondary-alkylated rhodamine dyes, Serial No. 323,191, filed on even date herewith.

By substituting corresponding molecular proportions of isopropylamino phenol, secondary-butyl amino phenol, or a higher secondary-alkyl-amino homolog, for the isopropylamino cresol employed in the above example, corresponding rhodamine bases may be obtained, which are also red to brown solids and have the probable formula:

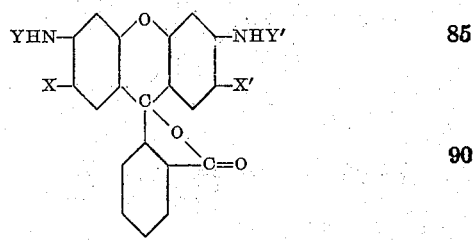

wherein $X$ and $X'$ represent hydrogen or an alkyl group, and $Y'$ and $Y$ each represent a secondary-alkyl group.

It is to be noted, that if in the above example, the corresponding amino phenol is condensed with phthalic anhydride, a relatively lower yield of rhodamine base will be obtained unless a suitable condensing agent, such as, zinc chloride, sulfuric acid, and the like, is also employed. It has been found, however, that in the condensation of the mono-alkylamino cresols, substantially the same yields are obtained in the absence of a condensing agent as when a condensing agent is employed.

Upon esterification of the rhodamine base above described, the corresponding alkyl esters can be obtained, as illustrated by the following examples.

Example 5.—A mixture of 20 parts of di-isopropyl rhodamine base obtained in accordance with Example 4, about 36 parts of sulfuric acid (66° Bé.), and about 120 parts of methyl alcohol (methanol) is refluxed at its boiling point for about 20 hours, or until the esterification is substantially complete. While still hot, the solution is poured into about 700 parts of cold water, and, if necessary, salt (NaCl) is added until the color is substantially all separated. The mother-liquor is carefully removed by decantation or filtration, and the dyestuff is washed, preferably with a dilute (about 10%) salt solution. The product is then boiled with about 300 parts of water, and the solution is filtered clear while hot. About 60 parts of concentrated hydrochloric acid is added to the clear hot filtrate, preferably with agitation, the dyestuff is allowed to separate, and is removed and dried. It is the methyl ester of di-isopropyl rhodamine, being when pulverized a red powder, soluble in water with a greenish fluorescence, dyeing textile fibres bluer and brighter shades of red than Rhodamine 6G (C. I. No. 752), and having the following probable formula:

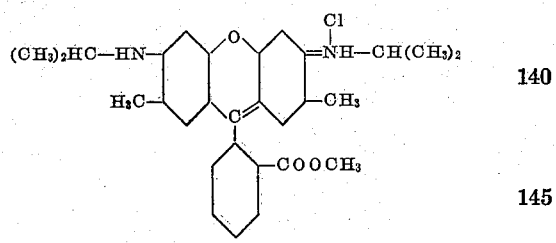

By substituting a corresponding homologous rhodamine base for the di-isopropyl rhodamine base of the above example, and by employing ethyl alcohol or another alcohol instead of methanol, dyestuffs may be produced which are similar in properties to those of the di-isopropyl rhodamine of the above example, and which have the following probable formula:

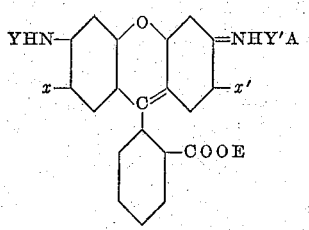

wherein X and X' represent hydrogen or an alkyl group, Y' and Y each represent a secondary-alkyl group, such as

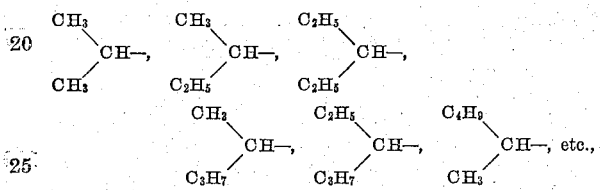

represents an alkyl group, such as $CH_3$, $C_2H_5$, $C_3H_7$, $C_4H_9$, etc., and A represents an acidic anion, such as, —Br, —Cl, ½—$SO_4$, etc.

It will be understood that the process described in Example 3 is not limited to the preparation of mono-alkylamino phenols and the rhodamines derived therefrom, but that the process is applicable to the preparation of amino phenols generally, and rhodamines generally. Thus, metanilic acid can be diethylated, the reaction mass can be fused, preferably with exclusion of air, and the corresponding dialkyl amino phenol can be used without purification for the preparation of rhodamine. The following example illustrates the preparation of Rhodamine B from meta-diethylamino benzene sulfonic acid sodium salt.

*Example 6.*—A fusion pot, preferably made of iron, and equipped with an agitator, a thermometer well, and openings for feeding material and an inert gas, is charged with 270 parts of potassium hydroxide, and heated until the hydroxide melts. Agitation and introduction of an inert gas (such as superheated steam or ammonia) is begun and continued throughout the fusion. 380 parts of sodium diethylmetanilate (obtainable, for example, by the interaction of metanilic acid, potassium carbonate, sodium hydroxide, and ethyl chloride) is gradually added while maintaining the temperature in the neighborhood of about 240° C., about 1½ hours being required for the addition. The fusion mass is then heated for an additional period of about 4 hours, or until the reaction is complete, at a temperature of about 250° C. While continuing the introduction of the inert gas, the fusion mass is permitted to cool to a temperature above its solidification point. The fusion mass is then diluted, either by adding water cautiously thereto or by drowning the mass in cold water. The resulting solution is then worked up in a manner similar to that described in Example 3. The resulting granular meta-diethylamino phenol is preferably dried in a vacuum with exclusion of air. The dried meta-diethylamino phenol thus obtained has a setting point of about 71° C., and is sufficiently pure to be used, without further purification, directly for the manufacture of Rhodamine B according to the well known methods. An approximately theoretical yield of meta-diethylamino phenol is obtained.

It is furthermore to be understood that the invention is not limited to the above specific examples, but that the various proportions, ingredients, conditions and manipulations described in said examples are subject to variation within the scope of the claims.

Thus, instead of subjecting a single mono-secondary-alkyl aromatic amine to sulfonation and further treatment in accordance with the process of the invention, a mixture of mono-secondary-alkyl aromatic amines may be treated, whereby mixtures of dyestuffs and of intermediate products as well as mixed dyestuffs (that is, dyestuffs which are partly derived from one amino-phenol and partly from a different amino-phenol) will be obtained. It will therefore be evident that in the above formulas for the rhodamine bases and rhodamine dyestuffs, Y' and Y may be different secondary-alkyl groups as well as the same secondary-alkyl group.

In sulfonating the mono-secondary-alkyl arylamine, the strength of the oleum may be varied and various proportions of oleum and sulfuric acid may be used, provided only that there is present in the reaction mixture an excess of $SO_3$ over that theoretically required to mono-sulfonate the secondary-alkylamine. The process can also be varied in that the oleum and secondary-alkyl amine can be mixed in the cold and then brought to the reaction temperature. The sulfonation temperature can be varied from about 0° to about 100° C. although temperatures below about 80° C. are preferred, the higher temperatures requiring less time for the completion of the sulfonation. Instead of separating the sulfonic acids from the sulfonation mixture as the free acids, they may also be separated as the alkali-metal salts in any well known manner; as for example, by diluting the sulfonation mixture with water, liming out, removing the calcium sulfate, converting the calcium sulfonates to the corresponding alkali-metal salts by treatment with alkali-metal carbonate, and concentrating the resulting solution or evaporating to dryness. The resulting alkali-metal salts of the mono-secondary-alkylamino aryl sulfonic acids, either in the form of their concentrated solutions or in the dry form, may be subjected to the caustic fusion process above described for the preparation of the corresponding amino-phenols instead of the free sulfonic acids.

In preparing the secondary-alkylamino aromatic sulfonic acids by reaction of the corresponding secondary-alkyl halide with the corresponding primary amino aromatic sulfonic acid or salt in the presence of an alcohol, the secondary-alkyl chloride, bromide or iodide may be employed, the reaction preferably being carried out under pressure in order to secure a more elevated reaction temperature and a correspondingly shorter reaction period. Among the alcohols which may be used, ethyl alcohol, isopropyl alcohol, and higher alcohols may be mentioned; and with sufficiently high-boiling alcohols, pressure is not essential and the reaction may be carried out under reflux.

In carrying out the fusion to form the secondary-alkylamino phenol, part of the potassium hydroxide may be replaced by sodium hydroxide. The superheated steam employed to form an inert atmosphere over the surface of the fusion mass is preferably superheated to the fusion temperature, but it may be heated to any desired temperature, and need not be superheated provided sufficient heat is supplied to the fusion mass to maintain it at the desired fusion temperature. If desired, other inert gases such as ammonia, nitrogen, etc., may be employed instead of the superheated steam.

In recovering the mono-secondary-alkylamino phenol from the fusion mixture by treatment with sulfuric acid, instead of adding sulfuric acid until just slightly alkaline to phenolphthalein, the solution can be made acid to phenolphthalein with sulfuric acid and then brought back to slight alkalinity by the addition of alkali-metal carbonate. Instead of isolating the aminophenol in accordance with the method described, other methods may be used; such as, the well known methods of isolating aminophenols from their fusion masses which involve the addition of an excess of mineral acid to the fusion mass, the elimination of SO₂ by boiling, and the neutralization of the resulting solution with sodium carbonate.

In working up the reaction mixture resulting from the condensation of the meta-mono-secondary-alkylamino phenol with phthalic anhydride, other alkali-metal hydroxides may be employed, such as, potassium hydroxide or ammonium hydroxide, and sodium hydroxide is to be preferred.

In preparing the rhodamine dyestuff by esterification of the corresponding rhodamine base, alcohol saturated with HCl gas can be substituted for the mixture of alcohol and sulfuric acid, and furthermore, the esterification can be performed with an alkyl halide instead of an alcohol and an esterification catalyst.

It will be understood that the process of the invention is not limited to the preparation of rhodamine dyestuffs and intermediates from intermediate products which have not been substantially completely purified, but that the invention also includes within its scope the preparation and employment of purified products and intermediates.

I claim:

1. An isopropylamino benzene compound having the general formula:

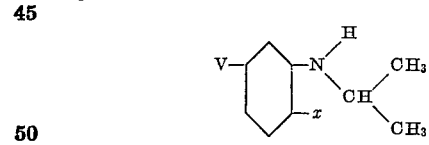

wherein $x$ represents hydrogen or an alkyl group, and V represents an —OH group, an —SO₃H group, or an alkali metal salt of a sulfonic acid group.

2. An isopropylamino-phenol having the general formula:

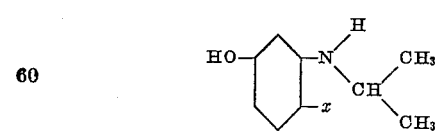

wherein $x$ represents hydrogen or an alkyl group.

3. An isopropylamino-cresol having the formula:

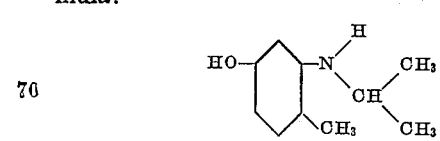

and crystallizing from benzene in the form of crystals having a setting point of about 94.5° C.

4. An isopropylamino-arylsulfonic acid having the general formula:

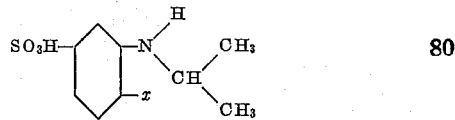

wherein $x$ represents hydrogen or an alkyl group.

5. An isopropyltoluidine sulfonic acid having the formula:

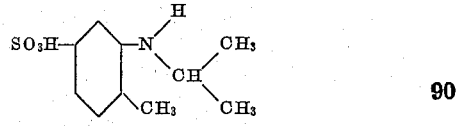

6. The process which comprises mono sulfonating an isopropylarylamine to produce the corresponding mono meta-isopropylarylamine mono sulfonic acid, and fusing said sulfonic acid with caustic alkali to produce the corresponding isopropylaminophenol.

7. The process which comprises mono sulfonating isopropyl-toluidine to produce the corresponding mono o-isopropyl-toluidine-m-monosulfonic acid, and fusing said sulfonic acid with caustic alkali to produce the corresponding mono isopropylaminocresol.

8. The process which comprises mono sulfonating an isopropylarylamine to produce the corresponding mono meta-isopropylarylamine monosulfonic acid.

9. The process which comprises mono sulfonating isopropyltoluidine to produce the corresponding mono o-isopropyltoluidine-m-monosulfonic acid.

10. A mono-secondary-alkylamino phenol compound having the general formula:

wherein $x$ represents hydrogen or an alkyl group, Y represents a secondary-alkyl group, and V represents an —OH group, an —SO₃H group, or an alkali metal salt of a sulfonic acid group.

11. A mono-secondary-alkyl-amino phenol compound having the general formula

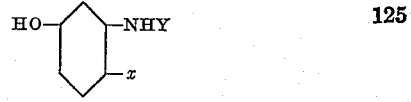

wherein $x$ represents hydrogen or an alkyl group and Y represents a secondary-alkyl group.

12. A mixture of secondary-alkylamino aryl sulfonic acid compounds having the probable formula:

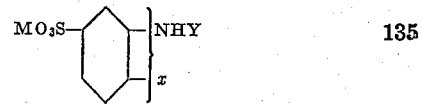

wherein $x$ represents hydrogen or an alkyl group, Y represents a secondary-alkyl group, and M represents hydrogen or an alkali metal.

13. A secondary-alkylamino aryl sulfonic acid compound having the general formula:

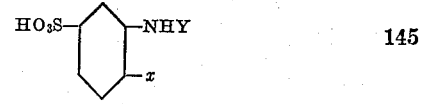

wherein $x$ represents hydrogen or an alkyl group and Y represents a secondary-alkyl group.

LUCAS P. KYRIDES.

Certificate of Correction

Patent No. 1,981,515.   November 20, 1934.

LUCAS P. KYRIDES

It is hereby certified that errors appear in the printed specification of the above numbered patent requiring correction as follows: Page 4, line 40, first line of formula, for "$SO_3HM$" read $SO_3H$; page 7, line 26, for "and" read *but*; and line 132, claim 12, for "probable" read *general*; and that the said Letters Patent should be read with these corrections therein that the same may conform to the record of the case in the Patent Office.

Signed and sealed this 11th day of December, A. D. 1934.

[SEAL]   LESLIE FRAZER,
*Acting Commissioner of Patents.*